US008799093B2

(12) United States Patent
Stillman

(10) Patent No.: US 8,799,093 B2
(45) Date of Patent: Aug. 5, 2014

(54) METHOD, COMPUTER READABLE MEDIUM, AND SYSTEM FOR ASSISTING A CUSTOMER IN MAKING PURCHASES

(75) Inventor: Scott Stillman, Peachtree City, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 718 days.

(21) Appl. No.: 12/273,288

(22) Filed: Nov. 18, 2008

(65) Prior Publication Data
US 2009/0076930 A1    Mar. 19, 2009

Related U.S. Application Data

(62) Division of application No. 10/610,266, filed on Jun. 30, 2003, now Pat. No. 7,454,368.

(51) Int. Cl.
*G06Q 30/00*        (2012.01)
(52) U.S. Cl.
USPC .......................................... 705/26.1; 705/27.1
(58) Field of Classification Search
USPC ................................................ 705/26.1–27.2
See application file for complete search history.

(56) References Cited

U.S. PATENT DOCUMENTS

| | | | |
|---|---|---|---|
| 5,974,406 A | 10/1999 | Bisdikian et al. | |
| 6,687,341 B1 | 2/2004 | Koch et al. | |
| 6,714,778 B2 | 3/2004 | Nykanen et al. | |
| 6,778,991 B2 | 8/2004 | Tenorio | |
| 6,816,578 B1 | 11/2004 | Kredo et al. | |
| 6,865,261 B1 | 3/2005 | Rao et al. | |
| 6,891,932 B2 | 5/2005 | Bhargava et al. | |
| 7,303,474 B2 | 12/2007 | Anderson et al. | |
| 7,684,554 B1* | 3/2010 | Vincent et al. | 379/220.01 |
| 2002/0143655 A1* | 10/2002 | Elston et al. | 705/26 |
| 2004/0230440 A1* | 11/2004 | Malhotra | 705/1 |
| 2004/0264663 A1 | 12/2004 | Enzmann et al. | |
| 2004/0267549 A1 | 12/2004 | Anderson et al. | |
| 2004/0267585 A1 | 12/2004 | Anderson et al. | |
| 2005/0014117 A1 | 1/2005 | Stillman | |
| 2006/0031486 A1* | 2/2006 | Miner | 709/224 |
| 2009/0030811 A1* | 1/2009 | Gilberto et al. | 705/26 |
| 2009/0222358 A1* | 9/2009 | Bednarek | 705/27 |

FOREIGN PATENT DOCUMENTS

WO    00/65514    11/2000

OTHER PUBLICATIONS

Bruce Lucas "VoiceXML for Web-Based Distributed Conversational Applications", Communications of the ACM, Sep. 2000, vol. 43, No. 9, pp. 53-57.*
"Voice eXtensible Markup Language VoiceXML," VoiceXML Forum, (Mar. 2000).

(Continued)

*Primary Examiner* — Michael Misiaszek
(74) *Attorney, Agent, or Firm* — Greenblum & Bernstein, P.L.C.

(57) ABSTRACT

A method of assisting a customer in making purchases includes receiving a voiced call from the customer at an automated voice services node. Voice instructions from the customer are received through the received voiced call at the voice services node. The voice instructions pertain to the purchase to be made for the customer. The voice instructions are interpreted to generate instruction data. A stored customer profile is located. The customer profile provides governing data for purchases for the customer. An automated purchase is initiated over a communications network in accordance with the instruction data and customer profile.

14 Claims, 4 Drawing Sheets

(56) References Cited

OTHER PUBLICATIONS

Lucas, "VoiceXML for Web-Based Distributed Conversational Applications," Communications of the ACM, vol. 34, No. 9, pp. 53-57 (Sep. 2000).

"i3 Mobile & Nuance," ASRNews—Automatic Speech Recognition, vol. 13, No. 8, (Aug. 2002).

"RezConnect," ASRNews—Automatic Speech Recognition, vol. 11, No. 2, (Feb. 2000).

"EbizPortals Bring Shopping to netECHO," ASRNews—Automatic Speech Recognition, vol. 12, No. 3, (Mar. 2001).

"ViaFone & Ticketmaster," ASRNews—Automatic Speech Recognition, vol. 11, No. 7, (Jul. 2000).

"CommWorks Enhances UC," ASRNews—Automatic Speech Recognition, vol. 13, No. 4, (Apr. 2002).

"Fandango Provides Movie Tickets," ASRNews—Automatic Speech Recognition, vol. 13, No. 1, (Jan. 2002).

* cited by examiner

METHOD, COMPUTER READABLE MEDIUM, AND SYSTEM FOR ASSISTING A CUSTOMER IN MAKING PURCHASES

CROSS-REFERENCE TO RELATED APPLICATIONS

This application is a divisional of U.S. patent application Ser. No. 10/610,266, filed on Jun. 30, 2003, the disclosure of which are expressly incorporated by reference in their entirety.

TECHNICAL FIELD

The present invention is related to assisting customers in making purchases of goods and/or services. More specifically, the present invention is related to automating the purchase process while providing for customer input through verbal communications to initiate the purchases.

BACKGROUND

Consumers face many issues when intending to purchase goods and services such that the purchase may never occur. One issue consumers face is simply remembering to make a purchase. For example, consumers may often intend to make purchases for certain occasions such as flowers for birthdays or deaths. However, consumers often forget or are too busy to find the time to make these types of purchases. The consumer will often feel regret when the purchase is not made.

Additionally, purchasing goods or services typically involves shopping around to find the goods or services that meet certain criteria and also to find the best price. The consumer has many options when shopping, both on-line over the Internet and off-line at conventional brick and mortar points of sale. Such shopping can require considerable amounts of time if the consumer wants to find the best option available.

Consideration must also be given to the delivery of the goods or services once they have been purchased, such as the delivery of flowers purchased for someone's birthday. This requires additional time and thought on the part of the consumer and is one more factor that discourages the consumer with following through with an intended purchase.

SUMMARY

Embodiments of the present invention address these and other issues by automating the purchase process while allowing the customer to provide verbal instruction for the purchase over a voiced call. Thus, when an intention to make a purchase crosses the mind of the customer, a verbal instruction from the customer can be placed over a voiced call to cause the automated purchase to occur, thereby freeing the customer from remembering to later make the purchase as well as finding and spending the time shopping.

One embodiment is a method of assisting a customer in making purchases. The method involves receiving a voiced call from the customer at an automated voice services node. Voice instructions are received from the customer through the received voiced call at the voice services node, and the voice instructions pertain to the purchase to be made for the customer. The voice instructions are interpreted to generate instruction data. A stored customer profile is located and provides governing data for purchases for the customer. An automated purchase is initiated over a communications network in accordance with the instruction data and customer profile.

Another embodiment is a system for assisting a customer in making purchases. A voice services node receives voiced calls from customers and converts voice instructions from the customers to instruction data. A customer profile database contains governing data for purchases for the customers and groups governing data for each customer. A computer-implemented customer agent receives the instruction data generated by the voice services node and the governing data from the customer profile database to initiate the automated purchase over a communications network for the customer based on the instruction data and the governing data for the customer. A network-based computer-implemented application receives an indication from the voice services node that the customer has provided instructions for a purchase and activates the customer agent for the customer who placed the voiced call.

Another embodiment is a method of assisting a customer in making purchases. The method involves locating a stored customer profile that provides governing data for purchases for the customer. An automated search of purchase options is initiated over a communications network in accordance with the customer profile to gather purchase option data. An automated notification of the purchase option data is generated and delivered to the customer. Voice instructions are received from the customer through a voiced call at a voice services node, and the voice instructions pertain to a purchase to be made for the customer from the purchase options. The voice instructions are interpreted to generate instruction data, and an automated purchase is initiated in accordance with the instruction data.

DETAILED DESCRIPTION

Embodiments of the present invention provide a customer with a network-based service that handles finding and purchasing goods and services for the customer so that the customer is freed from many of the burdens associated with such purchases. The customer is freed from subsequently remembering to make the purchase and no longer faces the hassles of shopping for the most appropriate selection and price.

Figure 1:
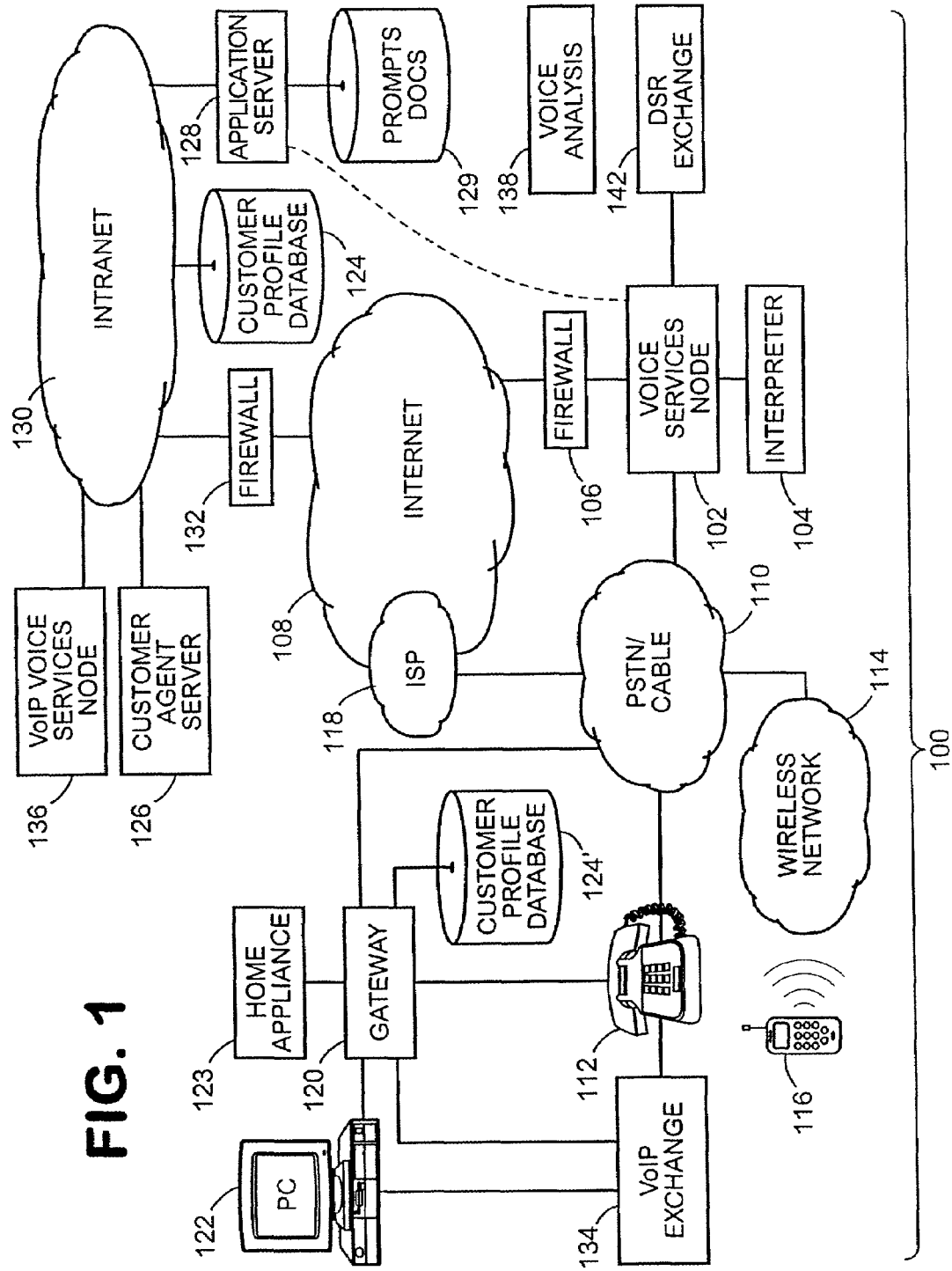
FIG. 1 shows one illustrative embodiment of a system for assisting customers in making purchases where verbal communication from the customer is received.

FIG. 1 illustrates one example of an encompassing communications network interconnecting verbal communications devices of the customer with the network-based system that automates the purchase process. The customer may access the system through several different channels of verbal communication. As discussed below, the customer communicates verbally with a voice services node that may be present in various locations for different embodiments.

As one example, the customer may place a conventional voiced telephone call from a telephone 112 through a network 110 for carrying conventional telephone calls such as public switched telephone network ("PSTN") or adapted cable television network. The call terminates at a terminating voice services node 102 of the PSTN/cable network 110 according to the number dialed by the customer. This voice services node 102 is a common terminating point within an advanced intelligent network ("AIN") of modern PSTNs or adapted cable networks and is typically implemented as a soft switch and media server combination.

Another example of accessing the system is by the customer placing a voiced call from a wireless phone 116. The wireless phone 116 maintains a wireless connection to a wireless network 114 that includes base stations and switching centers as well as a gateway to the PSTN/adapted cable network 110. The PSTN/cable network 110 then directs the call from the wireless phone 116 to the voice services node 102 according to the number dialed by the customer on the wireless phone 116. Furthermore, the wireless phone 116 may function as a thin client device relative to the verbal functions of the automated purchasing system such that the wireless phone 116 implements a distributed speech recognition ("DSR") platform to minimize the information transmitted through the wireless connection. The DSR platform takes the verbal communication received from the customer at the wireless device 116 and generates parameterization data from the verbal communication. The DSR platform then transmits the parameterization data as the verbal communication to the voice service node 102 or 136 rather than all the data representing the verbal communications. The voice services node 102 or 136 then utilizes a DSR exchange function 142 to translate the DSR parameterization data into representative text which the voice services node 102 or 136 can deliver to an application server 128.

Another example of accessing the system is by the customer placing a voiced call from a voice-over-IP ("VoIP") based device such as a personal computer 122 or where telephone 112 is a VoIP phone. This VoIP call from the customer may be to a local VoIP exchange 134 which converts the VoIP communications from the customer's device into conventional telephone signals that are passed to the PSTN 110 and on to the voice services node 102. The VoIP exchange 134 converts the conventional telephone signals from the PSTN 110 to VoIP packet data that is then distributed to the telephone 112 or computer 122 where it becomes verbal information to the customer. Furthermore, the wireless phone 116 may be VoIP capable and may provide VoIP communications with the wireless data network where the VoIP is converted to speech prior to transfer to a voice services node 102.

The VoIP call from the customer may alternatively be through an Internet gateway 120 of the customer, such as a broadband connection or wireless data network 114, to an Internet Service Provider ("ISP") 118. The ISP 118 interconnects the gateway 120 of the customer or wireless data network 114 to the Internet 108 which then directs the VoIP call according to the number dialed, which signifies an Internet address of a voice services node 136 of an intranet 130 from which the purchasing service is provided. This intranet 130 is typically protected from the Internet 108 by a firewall 132. The voice service node 136 includes a VoIP interface and is typically implemented as a media server which performs the VoIP-voice conversion such as that performed by the VoIP exchange 134 but also performs text-to-speech, speech recognition, and natural language understanding such as that performed by the voice services node 102 and discussed below. Accordingly, the discussion of the functions of the voice services node 102 also applies to the functions of the voice service node 136.

As yet another example, the wireless device 116 may be a wireless data device such as a personal digital assistant. The wireless device 116 and/or personal computer 122 may have a wi-fi wireless data connection to the gateway 120 or directly to the wireless network 114 such that the verbal communication received from the customer is encoded in data communications between the wi-fi device of the customer and the gateway 120 or wireless network 114.

Another example of accessing a voice services node 102 or 136 is through verbal interaction with an interactive home appliance 123. Such interactive home appliances may maintain connections to a local network of the customer as provided through a gateway 120 and may have access to outbound networks, including the PSTN/cable network 110 and/or the Internet 108. Thus, the verbal communication may be received at the home appliance 123 and then channel via VoIP through the Internet 108 to the voice services node 136 or may be channeled via the PSTN/cable network 110 to the voice services node 102.

Yet another example provides for the voice services node to be implemented in the gateway 120 or other local device of the customer so that the voice call with the customer is directly with the voice services node within the customer's local network rather than passing through the Internet 108 or PSTN/cable network 110. The data created by the voice services node from the verbal communication from the customer is then passed through the communications network 100, such as via a broadband connection through the PSTN/cable 110 and to the ISP 118 and Internet 108 and then on to the application server 128. Likewise, the data representing the verbal communication to be provided to the customer is provided over the communications network 100 back to the voice services node within the customer's local network where it is then converted into verbal communication provided to the customer.

The voice services node 102 provides text-to-speech conversions to provide verbal communication to the customer over the voiced call and performs speech recognition to receive verbal communication from the customer. Accordingly, the customer may carry on a natural language conversation with the voice services node 102. To perform these conversations, the voice services node 102 implements a control service logic written in a language such as or similar to the well-known voice extensible markup language ("VoiceXML") context which utilizes a VoiceXML interpreter function 104 of the voice services node 102 in conjunction with VoiceXML documents. Another control service logic language that may be utilized is the speech application language tags ("SALT") platform. The interpreter function 104 of the voice services node 102 operates upon the VoiceXML or SALT documents to produce verbal communication of a conversation. The VoiceXML or SALT document provides the content to be spoken from the voice services node 102. The VoiceXML or SALT document is received by the VoiceXML or SALT interpreter function 104 of the voice services node 102 through a data network connection of the communications network 100 in response to a voiced call being established with the customer at the voice services node 102. This data network connection as shown in the illustrative system of FIG. 1 includes a link through a firewall 106 to the Internet 108 and on through the firewall 132 to the intranet 130.

The verbal communication from the customer is received at the voice services node 102 and is converted into data representing each of the spoken words through a conventional speech recognition and natural language understanding function of the voice services node 102. The VoiceXML or SALT document that the VoiceXML or SALT interpreter 104 is operating upon sets forth a timing of when verbal information that has been received and converted to data is packaged in a particular request back to the VoiceXML or SALT document application server over the data network. This timing provided by the VoiceXML or SALT document allows the verbal responses of the customer to be matched with the verbal questions and responses of the VoiceXML or SALT document. Matching the communication of the customer to the communication from the voice services node enables an application server 128 of the intranet 130 to properly act upon the verbal communication from the customer. As shown, the application server 128 may interact with a voice services node through an intranet 130, through the Internet 108, or through a more direct network data connection as indicated by the dashed line.

The application server 128 is a conventional computer server that implements an application program to control the automated purchasing service for the customer. The application server 128 provides the VoiceXML or SALT documents to the voice services node 102 to bring about the conversation with the customer over the voiced call through the PSTN 110 and/or to the voice services node 136 to bring about the conversation with the customer over the VoIP Internet call. The application server 128 may additionally or alternatively provide files of pre-recorded verbal prompts to the voice services node where the file is implemented to produce verbal communication. The application server 128 may store the various pre-recorded prompts, grammars, and VoiceXML or SALT documents in a database 129. The application server 128 also initiates action by the customer agent server 126 which implements a customer agent application program to perform the searching and purchasing functions for a customer. The application server also interacts with a customer profile database 124 that stores profile information for each customer, such as the particular preferences of the customer for various purchases.

In addition to providing VoiceXML or SALT documents to the one or more voice services nodes of the communications network 100, the application server 128 may also serve hypertext markup language ("HTML"), wireless application protocol ("WAP"), or other distributed document formats depending upon the manner in which the application server has been accessed. For example, a customer may choose to send the application server profile information by accessing a web page provided by the application server to the personal computer 122 through HTML or to the wireless device 116 through WAP via a data connection between the wireless network 114 and the ISP 118. Such HTML or WAP pages may provide a template for entering information where the template asks a question and provides an entry field for the customer to enter the answer that will be stored in the profile database 124.

The profile database 124 may also be populated with information that is obtained from secondary sources, rather than directly from the customer. For example, to relieve the customer of the time and hassle of building all of the information in the profile database, other sources of data such as external billing records for a customer may be accessed, with the consent of the customer, to obtain profile data. Because such billing records are often electronic themselves, the transfer of data from the billing records to the profile database 124 may itself be an automated process.

The profile database 124 contains the preference information that has been provided by the customer or has been obtained in other manners discussed above. The application server 128 provides the relevant profile data for a particular search or purchase to the customer agent server 126 when a search and/or purchase is to be performed for the customer. The profile database 124 may contain many categories of information for a customer. For example, the profile database 124 may contain payment preferences of the customer such as various credit accounts to be used. The profile database 124 may contain item preferences such as the permissible brands of products and services to be purchased and the permissible vendors that the purchase may be made from. As a specific example, the profile database 124 may specify the type of flowers to be automatically purchased each year on Valentine's Day and/or on a birthday. Additionally, the customer profile may specify the range of acceptable prices for the goods and services to be purchased.

As shown in FIG. 1, the profile database 124 may reside on the intranet 130 for the network-based purchasing service. However, the profile database 124 likely contains information that the customer considers to be sensitive, such as the credit account information. Accordingly, an alternative is to provide the customer profile database storage 124' at the customer's residence or place of business so that the customer feels that the profile data is more secure and is within the control of the customer. In this case, the application server 128 maintains an address of the customer profile database storage 124' rather than maintaining an address of the customer profile database 124 of the intranet 130 so that it can access the profile data as necessary and provide it to the customer agent 126.

Figure 2:
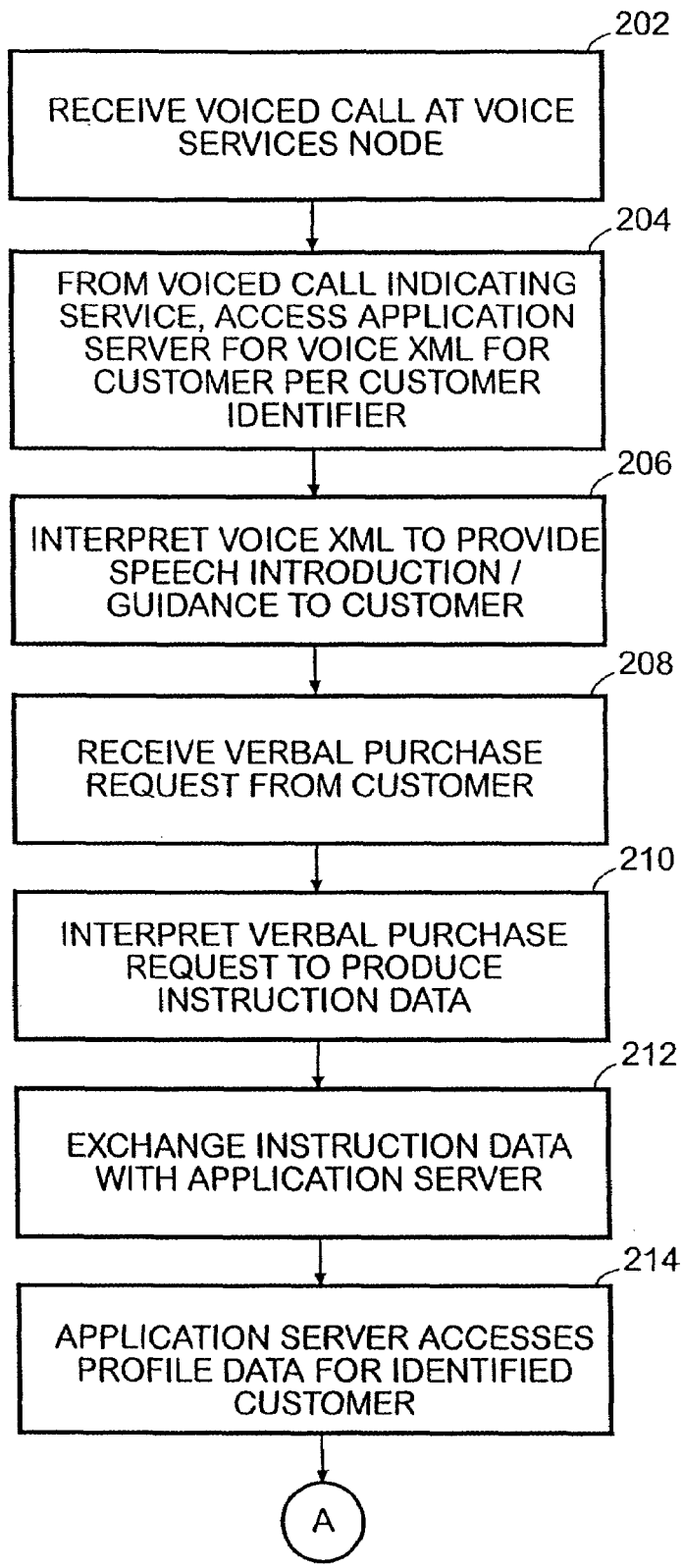
FIGS. 2 and 3 illustrate one set of logical operations that may be performed within the system of FIG. 1 to automate the purchase process.
Figure 3:
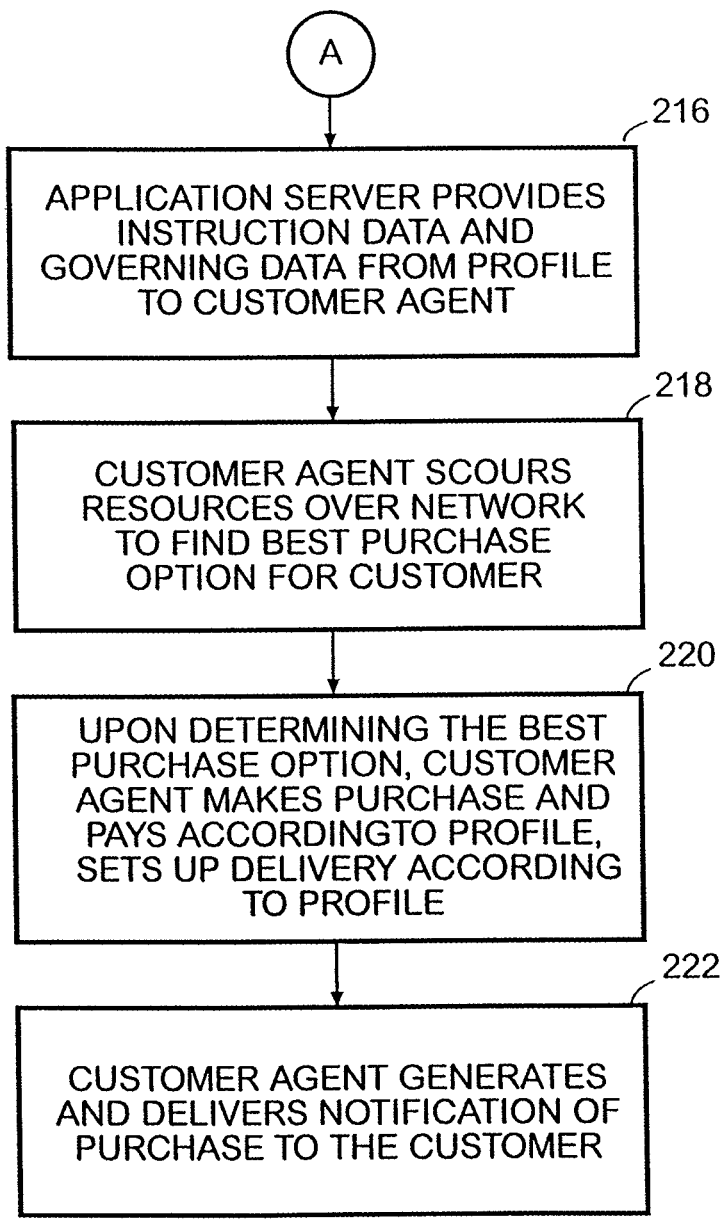

FIGS. 2-3 illustrate one example of logical operations that may be performed within the communications network 100 of FIG. 1 to bring about the automated purchases for the customer. This set of logical operations is provided for purposes of illustration and is not intended to be limiting. For example, these logical operations discuss the application of VoiceXML within the communications network 100. However, it will be appreciated that alternative platforms for distributed text-to-speech and speech recognition may be used in place of VoiceXML, such as SALT as discussed above or a proprietary, less open method.

The logical operations begin at call operation 202 where the customer places a voiced call to a voice services node such as by dialing the number for the purchasing service for the voice services node on the communications network or by selecting an icon on the personal computer where the voiced call is placed through the computer. At access operation 204, the voice services node accesses the appropriate application server according to the voice call (i.e., according to the number dialed, icon selected, or other indicator provided by the customer). Utilizing the dialed number or other indicator of the voice call to distinguish one application server from another allows a single voice services node to accommodate multiple verbal communication services simultaneously. The voice services node may provide identification data to the application server for the customer based on the received caller ID information for the customer, which allows the application server to access the profile for the customer.

Alternatively, the voice services node may implement a standard VoiceXML introduction page to inform the customer that he has dialed into the service and ask that the customer say his formal name or other form of identification, such as a user name and password. This identification can then be captured as data and provided back to the application server where it is utilized to access the profile for the customer. The profile may specify the particular VoiceXML pages that should be provided to the voice services node for this particular customer. For example, this customer may prefer to have a conversation where the return dialogue is upbeat as opposed to slow.

Once the voice services node receives the VoiceXML, it is interpreted at speech operation 206 to convert the VoiceXML text to speech that is then verbally provided to the customer. This verbal information may provide further introduction and guidance to the customer about using the system. This guidance may inform the customer that the customer can barge in at any time with a question or with an instruction. The guidance may also specifically ask that the customer provide a verbal command, such as a purchase request or a request to update the profile data.

Eventually, the voice services node receives a verbal purchase request from the customer at request operation 208. This verbal request may be detailed so that it provides many details that would otherwise be found in the profile for the customer. For example, the customer may request a purchase of an item and the request specifies the brand and acceptable price range. This request may also be more general, such as a request for a particular type of item without specifying any details such that the profile data will be relied upon to control the purchase.

The verbal request is interpreted at the voice services node to produce instruction data that represents the words spoken by the customer at recognition operation 210. This data is representative of the words spoken by the individual that are obtained within a window of time provided by the VoiceXML document for receiving verbal requests so that the application server can determine from keywords of the instruction data what the customer wants the service to do. The instruction data is transferred from the voice services node over the data network to the application server at exchange operation 212.

Upon receiving the instruction data, the application server accesses the governing profile data for the customer that controls how the purchase is to be performed by the customer agent at profile operation 214. The governing profile data fills in any gaps that were left by any lack of detail in the instruction provided by the customer. The application server provides this governing profile data that is relevant to the current request from the customer and the instruction data to the customer agent server at transfer operation 216.

Upon receiving the instruction data and any additional governing data from the profile, the customer agent begins scouring the available resources according to the profile and instruction data to find the best purchase option for the customer at agent operation 218. The resources of the customer agent include all commercial nodes of the communications network, including those of the global Internet. One parameter provided by the instruction data, the profile data, or as a default setting of the service is the amount of time that the customer agent spends searching for the best option before deciding to complete a purchase. Once the customer agent finds the best purchase option, the agent completes the automated purchase according to the instruction and profile data such as by paying with a particular credit account and selecting a particular delivery option. The purchase may be completed through conventional automated purchasing techniques where the purchase is completed by inserting information such as quantity, item number, color, etc. in fields of an order template.

After the customer agent has completed making the purchase for the customer, the customer agent and/or the application server generates a notification to the customer about the purchase at notification operation 222. The notification may be an email to an email address specified in the customer profile where the email is generated by the customer agent and delivered over the Internet to the personal computer of the customer or to a wireless device through the wireless network. Additionally or alternatively, the notification may be through a voiced call from a voice services node, such as through the PSTN, through a VoIP Internet call, or from a voice services node of the local network. One of the voice services nodes provides the notification in response to the application server providing a VoiceXML document or other data that the voice services node converts to speech and that specifies the notification.

The logical operations of FIGS. 2 and 3 demonstrate how the system of FIG. 1 allows a customer to call into the service and have a purchase be handled by simply providing verbal commands to the automated system. An additional application of the automated system of FIG. 1 is to search for options that a customer may wish to consider purchasing as opposed to requiring the customer to request a purchase before a search is performed. A set of logical operations that are provided for purposes of illustration and that establish the purchase options search are shown in FIG. 4.

Figure 4:
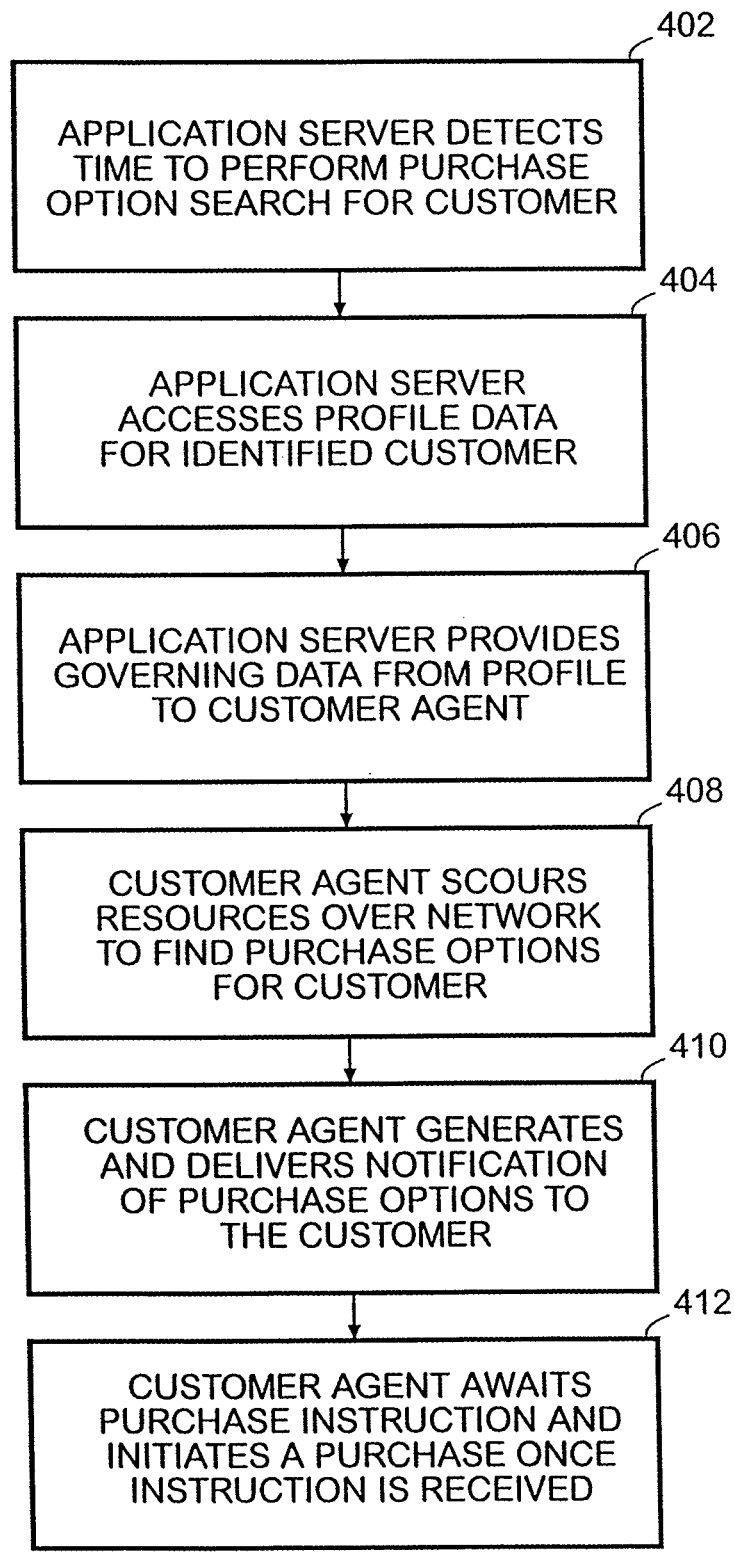
FIG. 4 illustrates a second set of logical operations that may be performed within the system of FIG. 1 to further automate the purchase process.

The logical operations of FIG. 4 begin at application operation 402 where the application server detects that the time has come to perform a purchase option search for the customer. The application server may detect that it is time to perform such a search in various ways. For example, the customer may make a voiced call to a voice services node and verbally request that a purchase option search be performed. The customer may visit a web page provided by the application server or send an email to the application server to request the purchase option search.

Upon the application server detecting that a purchase option search should be performed, the application server accesses the profile data for the customer at profile operation 404. The application server then provides the governing profile data relevant to the purchase option search to the customer agent at transfer operation 406. The customer agent then scours the available resources over the communication network to find the purchase options for the customer at agent operation 408. For example, the customer agent may search for each item noted in the profile to be of interest to the customer and upon finding an item that meets all the criteria for acceptable price, brand, vendor, etc., the item is flagged as a purchase option.

Once the customer agent has identified the purchase options that are available, the customer agent generates a notification of the purchase options to the customer at notification operation 410. As discussed above, the notification may be of various forms such as an email to a personal computer or wireless device. Furthermore, the customer agent may notify the application server which then provides a VoiceXML document to a voice services node so that a voiced call to the customer can be made to provide verbal notification.

After the notification has been generated, the customer agent and application await the customer to respond with a verbal instruction over a voiced call to a voice services node at instruction operation 412. Upon receiving an instruction from the customer to make one or more purchases from the set of purchase options, the customer agent returns to the previously flagged purchase option which the customer has elected and then completes the purchase and delivery setup.

As has been described above, an automated system provides customers with the ability to verbally request that purchases be made. The automated system performs the searching according to any criteria specified by the customer or specified through other means to find the best purchase opportunity for the customer. The purchase is then completed through an automated transaction. The customer is thereby relieved from at least some of the difficulties normally associated with shopping for and purchasing goods and services.

Although the present invention has been described in connection with various illustrative embodiments, those of ordinary skill in the art will understand that many modifications can be made thereto within the scope of the claims that follow.

Accordingly, it is not intended that the scope of the invention in any way be limited by the above description, but instead be determined entirely by reference to the claims that follow.

The invention claimed is:

1. A method of assisting a customer in making purchases, comprising:

receiving a voice call from the customer at an automated voice services node and receiving caller identifier data with the voice call;

receiving initial voice input from the customer through the received voice call at the voice services node, the initial voice input pertaining to the purchase to be made for the customer;

interpreting the initial voice input to generate instruction data;

locating a customer profile obtained and stored previous to the voice call and providing governing data for purchases for the customer, the customer profile being located in accordance with the caller identifier data provided with the voice call;

initiating an automated purchase over a communications network in accordance with the instruction data and customer profile, without receiving any additional voice input from the customer from when the initial voice input is received to when the automated purchase is initiated, and the automated purchase being initiated independent of any offering of choices offered to the customer in a voice menu, and notifying the customer of the initiated automated purchase, wherein verbal information provided to the customer from the automated voice services node is provided in accordance with voice extensible mark-up language instructions executed at the automated voice services node.

2. The method of claim 1, wherein notifying the customer comprises:

generating a notification of the status of the automated purchase; and delivering the notification to the customer.

3. The method of claim 1, wherein the governing data of the customer profile indicates permissible goods and services brands.

4. The method of claim 1, wherein the governing data of the customer profile indicates credit account information.

5. The method of claim 1, wherein the governing data of the customer profile indicates price ranges for various categories of items to be purchased.

6. The method of claim 1, wherein the governing data of the customer profile indicates permissible vendors.

7. The method of claim 1, wherein locating the stored customer profile comprises receiving caller identifier data through the voice call from the customer and looking up the customer profile according to the caller identifier.

8. The method of claim 1, wherein locating the stored customer profile comprises receiving a user name and password from the customer at the voice services node, and looking up the customer profile according to the user name and password.

9. The method of claim 2, wherein the notification is an email to an email address of the customer contained in the customer profile.

10. The method of claim 2, wherein the notification is a return voice call to the telephone of the customer at a telephone number contained in the customer profile, wherein the return voice call provides text to speech at the voice services node to speak the notification to the customer.

11. The method of claim 1, further comprising:

providing data to a customer profile database by receiving information from the computer of the customer, wherein the information is entered by the customer on the computer.

12. The method of claim 11, wherein providing data to the customer profile database further comprises the customer visiting a web site and entering data within a template of the web site.

13. The method of claim 1, further comprising:

providing data to a customer profile database by receiving a voice call from the customer to the voice services node, receiving voice information from the customer, and converting the voice information to data within the customer profile database.

14. The method of claim 1, wherein locating a stored customer profile and initiating the automated purchase are performed by an application server in conjunction with a customer agent server, wherein the customer agent server utilizes the customer profile data to generate purchase requests upon activation from the application server, and wherein the application server is in communication with the voice services node to receive an indication that the voice call for a customer purchase has been received, retrieve the profile data for the customer, and provide the customer profile data and the instruction data to the customer agent server.

* * * * *